United States Patent [19]

Molzahn

[11] 4,281,737

[45] Aug. 4, 1981

[54] BRAKING AND SPEED CONTROL SYSTEM

[75] Inventor: Herbert W. Molzahn, Hamilton, Canada

[73] Assignee: International Harvester Company, Chicago, Ill.

[21] Appl. No.: 106,982

[22] Filed: Dec. 26, 1979

[51] Int. Cl.³ .............................................. B60K 41/26
[52] U.S. Cl. ..................................... 180/307; 74/478; 180/648; 180/315; 192/4 A
[58] Field of Search ............... 180/307, 305, 308, 306, 180/6.48, 242, 243, 315, 333, 336; 192/4 A, 4 R; 74/478

[56] References Cited

U.S. PATENT DOCUMENTS

| 2,861,663 | 11/1958 | Witzel | 192/4 A |
|---|---|---|---|
| 3,354,981 | 11/1967 | Swanson et al. | 180/307 |
| 3,613,817 | 10/1971 | Glass et al. | 180/6.48 |
| 3,616,869 | 11/1971 | Rilling | 180/6.48 |
| 3,691,863 | 9/1972 | Shaffer | 74/478 |
| 3,897,840 | 8/1975 | Molzahn et al. | 180/6.48 |

Primary Examiner—Joseph F. Peters, Jr.
Assistant Examiner—Milton L. Smith
Attorney, Agent, or Firm—Dennis K. Sullivan; Neal C. Johnson; F. David AuBuchon

[57] ABSTRACT

A two pump, two motor hydrostatic drive vehicle is provided with service brakes having an operating linkage interconnected with the speed control linkage for the hydrostatic pump in such a manner that depressing the brake pedal returns the pump swash plate control arms to neutral and releasing the brake pedal returns the control arms to the forward speed position previously set by the operator speed control lever.

2 Claims, 5 Drawing Figures

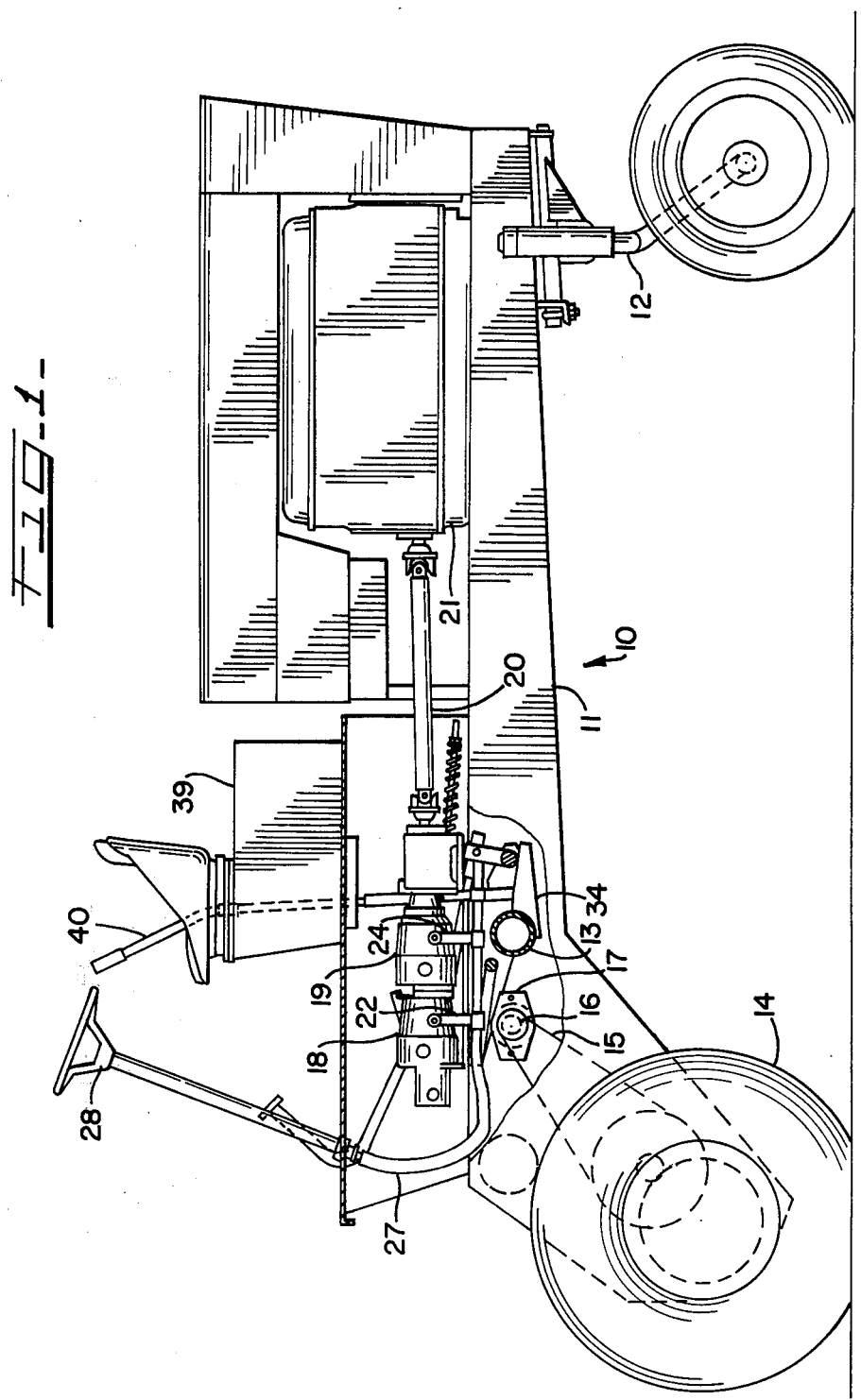

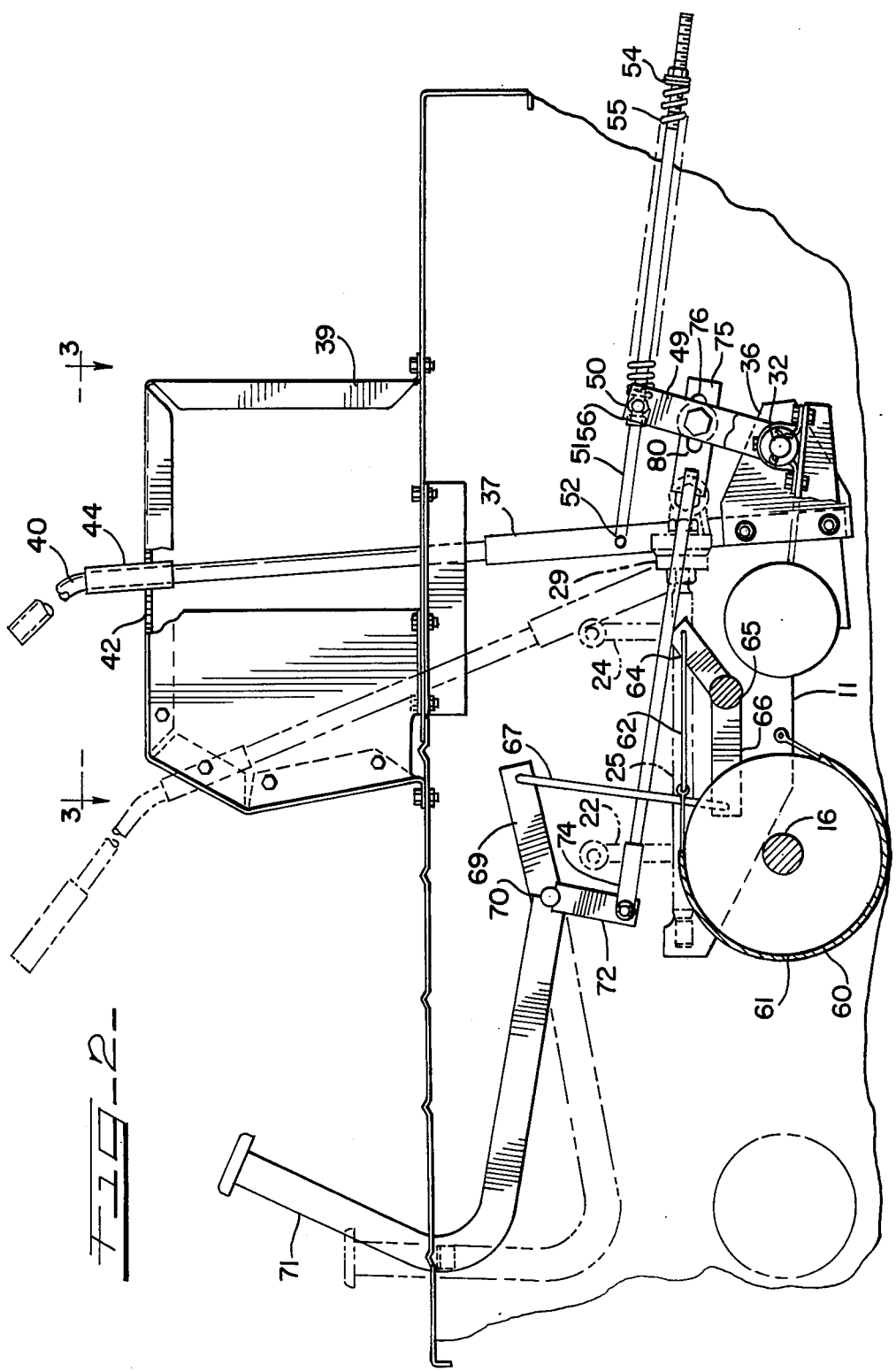

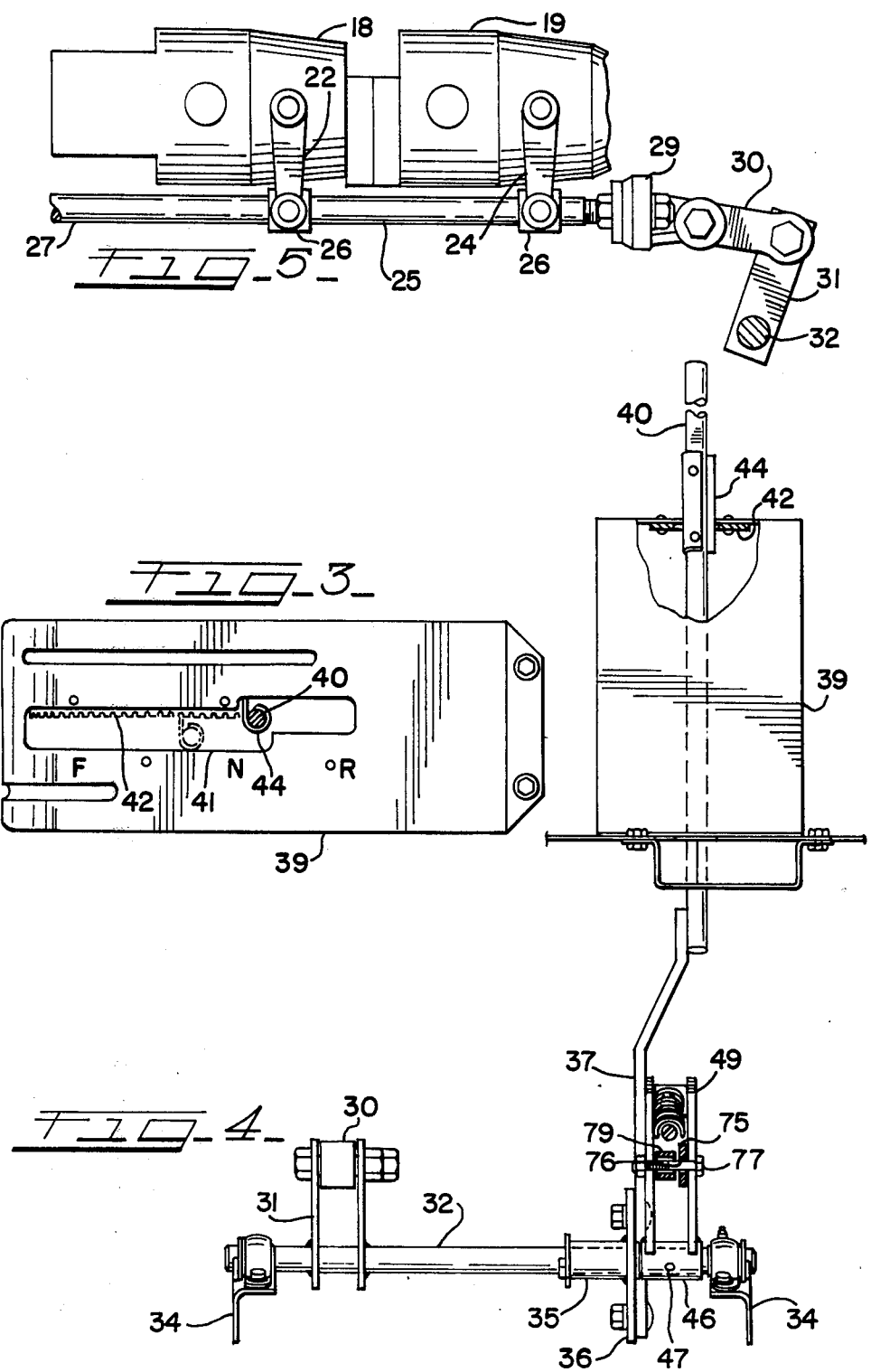

BRAKING AND SPEED CONTROL SYSTEM

This invention relates generally to speed and braking controls for self-propelled vehicles of the hydrostatic type having two pumps and two motors for effecting steering and propulsion, such as a windrower, and more particularly, to a control system wherein the braking system and the speed control system are interconnected in a manner permitting optimum operation of the windrower.

A typical steering and speed control system in a windrower is described in Molzahn et al. U.S. Pat. No. 3,897,840 wherein two hydrostatic pumps are disposed in line and connected to the engine, each pump being connected to a hydraulic motor respectively driving one of the ground wheels through a suitable reduction drive. A common control shaft interconnects the swash plate control arms of the pumps. By moving the control shaft forward or rearward both control arms are moved in equal amount and forward and reverse drive in a straight line is achieved. By rotating the control shaft, which is connected to the steering wheel, the control arms are moved in opposite directions, thereby creating different outputs of the hydrostatic pumps and, consequently, different drive wheel speeds causing the windrower to steer to one side or the other.

Generally, service brakes have not been provided on windrowers of this type because it was felt that sufficient braking could be achieved by returning the speed control lever to neutral and destroking the hydrostatic pumps, such as shown in U.S. Pat. No. 3,613,817 wherein the control lever is biased to the neutral position. Of course, some machines have been provided with parking brakes which are intended to maintain the machine in stopped condition and, in some cases, include an interlock to maintain the pump control shaft in a neutral straight-ahead position. Other vehicles having two pump, two motor drives have included emergency or parking brakes, such as shown in U.S. Pat. No. 3,616,989 wherein actuating the brake also returns and maintains the control lever in neutral.

It is the primary object of the invention described herein to provide a hydrostatically driven vehicle such as a windrower of the type described, with service brakes and a control linkage therefore which interacts with the speed control linkage to return the hydrostatic pumps to a neutral condition when the brake pedal is depressed.

A more particular object of the invention is to provide such a control linkage wherein the previously set speed control position is recovered upon release of the brake pedal.

The above objects are met in a windrower including service brakes having a pair of hydrostatic drive units with control arms connected to a common speed control apparatus wherein the operator's speed control lever which may be fixed in various forward speed positions is connected to the pump speed control apparatus by a first lost motion connection spring biased normally to follow the control lever. The linkage for the service brakes is connected by an override link to the pump speed control apparatus by a second lost motion connection, preferably an elongated slot, so disposed that when the brake pedal is not depressed, the second lost motion connection permits the full range of operation of the pump speed control apparatus in response to the speed control lever. When the brake pedal is depressed the lost motion is taken up and the override link returns the speed control apparatus to neutral overcoming the bias of the first lost motion connection if the operator speed control lever is fixed in a forward position.

other objects and advantages of the invention will become more apparent upon reading the detailed description of the invention and upon reference to the drawings in which:

FIG. 1 is a side view, partly in section, of the vehicle chassis illustrating the general arrangement of the drive, braking, and control components;

FIG. 2 is an enlarged view of the vehicle in FIG. 1 illustrating the brake and override apparatus with portions of the speed control linkage in phantom lines;

FIG. 3 is a top view of the speed control lever and panel assembly of the vehicle taken along the line 3—3 of FIG. 2;

FIG. 4 is a rear view of the linkage illustrated in FIG. 2; and

FIG. 5 is a detail illustrating the pump steering and speed control shaft.

DESCRIPTION OF THE PREFERRED EMBODIMENT

Turning now to FIG. 1, there is shown a vehicle generally designated 10 such as the chassis portion of a self-propelled windrower, of the type specifically described in U.S. Pat. No. 3,897,840 incorporated by reference herein, and including a main frame assembly 11 supported at its rear end by a caster wheel assembly 12 and at its front end by left and right drive wheels 14, only one of which is shown. Each of the drive wheels 14 is driven through a suitable reduction drive 15 from an output shaft 16 of hydraulic motor 17. The left and right hydraulic motors 17 are connected by suitable hydraulic hoses respectively to variable displacement hydraulic pumps 18 and 19 which are mounted in tandem on a common drive shaft on the vehicle frame 11 and are driven through drive shaft 20 by engine 21.

The hydraulic output from each of the hydraulic pumps is respectively controlled by a pump swash plate control arm 22, 24 respectively (FIG. 5) pivotally mounted on the pump housing. As more fully described in the referenced Pat. No. 3,897,840, the control arms 22, 24 of the respective hydraulic pumps are interconnected by a pump speed control shaft 25 which is attached by reversely threaded fittings 26 respectively to the control arms 22, 24. The left end of the control shaft 25 is connected by a flexible torque tube 27 to the steering wheel 28. Thus, rotation of the steering wheel will change the relative displacements of the pump control arms 22, 24 causing the vehicle to steer to the left or right. The rearward portion of the pump control shaft 25 is connected through a rotative fitting 29 and connecting link 30 to a lever 31 on the speed control rockshaft 32. The speed control rockshaft 32 is mounted as by bearings on brackets 34 mounted on the cross beam 13 of the frame assembly 11. It can be seen that rotation of the rockshaft 32 will cause the pump lever control arms 22, 24 to move in unison forward and rearward an equal amount thus providing straight ahead forward or rearward drive to the vehicle.

A sleeve 35 is pivoted on the rockshaft 32 and is provided at one end with a bracket 36 to which the lower end of the operator's speed control lever 37 is fixedly attached. The speed control lever 37 extends upwardly through control panel housing 39 to a handle 40 thereabove. As best seen in FIG. 3, the upper side of the speed control panel assembly 39 is provided with a slot 41 which provides for a range of travel of the speed control lever 37 through a plurality of positions from reverse through neutral to forward. The side of the slot 41 in the forward position is provided with a plurality of detents 42 which may be engaged by the edge of an elongated bracket 44 attached to the speed control lever 37 and projecting outwardly therefrom to fix the speed control lever 37 in one of the various forward speed positions. It will be noted that in the reverse end of the slot 41, there are no apertures 42 for the reason that it is undesirable to fix the speed control lever 37 in reverse speed positions. Rather it is preferable for the lever 37 to be returned to the neutral position by the hydraulic forces acting within the pumps on the control levers 22, 24 when the handle 40 is released by the operator in the reversed position.

A second sleeve 46 is mounted adjacent the speed control lever sleeve 35 on the control rockshaft 32, the second sleeve 46 being fixed as by pin 47 to the rockshaft 32 for movement therewith. A lever assembly 49 comprising a pair of spaced apart plates is attached to the sleeve 46 and extends radially outwardly therefrom to a distal end whereat a spring retainer 50 (FIG. 2) is pivotally mounted between the plates. An L-shaped rod 51 is pivoted on the speed control lever 37 as at 52 and extends through the spring retainer 50 on the lever 49 to a spring retainer 54 adjustably mounted on its threaded distal end. A compression spring 55 is disposed between the spring retainers 50, 54. The L-shaped rod 51 is further provided with a fixed stop 56 attached thereto on the side of the spring retainer 50 opposite the spring. Thus, a first lost motion connection is established between the pump speed control means, that is, pump arms 22, 24, the control shaft 25, lever 31, rockshaft 32 and lever 49, and the speed control lever 37 which is biased in such a manner that the pump speed control means is biased to follow the motion of the control lever 37 in its forward positions. The fixed stop 56 causes the lever 49 to follow the speed control lever 37 when the speed control lever is moved in the reverse direction.

The vehicle 10 is further provided with service brakes which may be of any known type for simultaneously braking the two drive wheels 14 and which here take the form of brake bands 60 having one end attached to the frame assembly 11 and extending around a brake drum 61 affixed to the output shaft 16 of the hydraulic motor 17 to a free end attached by connecting links 62 to a lever 64 attached to a brake rockshaft 65 which extends across the machine to a similar brake mounting on the opposite side. The brake rockshaft 65 is provided with an intermediate lever 66 which is connected by link 67 to a lever 69 on the brake pedal rockshaft 70. A brake pedal 71 is mounted to the brake pedal rockshaft 70 and extends forwardly and upwardly through the floor. Thus, when the operator pushes brake pedal 71, tension is put on the link 67 which tends to rotate the brake rockshaft 65 clockwise tightening the brake bands 60 about the brake drums 61 thus braking the hydraulic motor output shaft 16 and the wheels 14.

A second lever 72 is also attached to the brake pedal rockshaft 70 and has pivotally mounted to its other end an override link 74 of adjustable length which extends therefrom to a distal end 75 which passes through the legs of the control lever 49. The end 75 of the override link 74 is provided with a slot 76 which engages a pin 77 extending between the legs of the lever 49. A spacer 79 is provided on the pin 77 adjacent the override link end 75 to provide for free relative movement without jamming up. The elongated slot 76 thus forms a second lost motion connection through the lever 49 with the pump speed control means and is so disposed that when the brake pedal 71 is in its normal upward position with the brake 60 disengaged, slot 76 will provide the lever 49 with a full range of unimpeded motion in response to the operator's speed control lever 37 moving from full speed reverse to full speed forward. The slot 76, however, is positioned such that when the brake pedal 71 is depressed, the left end 80 of the slot 76 will engage the pin 75 in the lever 49 and move it to the neutral position thereby also moving the control arms 22 and 24 to the neutral position. In the event that the speed control lever 37 is in one of the forward speed conditions and is fixed there, as by engagement of the projecting edge 44 in one of the apertures 42, the engagement of the end 80 of the slot 76 with the pin 77 will overcome the bias of the spring 55 and push the control lever 49 to neutral. It will also be seen that with the speed control lever still fixed in a forward speed position, should the brake pedal 71 be released, the spring 55 will bias the pump speed control lever 49 back to the previously existing forward speed position so that the windrower may again be operated at its optimal forward speed for the field conditions encountered.

Thus, there has been provided in accordance with the invention a braking and speed control system for a vehicle which fully satisfies the objects, aims and advantages set forth above. It is recognized that in light of the foregoing description, many alternatives and modifications will become apparent to those of skill in the art. Accordingly, it is desired to claim all such alternatives and modifications as fall within the scope and spirit of the appended claims.

What is claimed is:

1. A vehicle comprising:
   a frame;
   a pair of drive wheels supporting said frame;
   a pair of hydrostatic drive units respectively for each of said drive wheels including a variable displacement pump and a hydraulic motor driven thereby and a control arm pivoted on each pump for varying the output thereof to its respective motor;
   pump speed control means operatively associated with both of said control arms for effecting simultaneous movement thereof in the same direction between neutral and forward positions;
   a manually operated speed control lever pivoted on said frame and having forward and neutral positions;
   means associated with said frame for fixing said speed control lever in a selected forward position;
   first spring-biased lost motion connecting means interconnecting said pump speed control means and said speed control lever in such a manner that said pump speed control means is normally biased to a forward speed position upon said speed control lever being in a forward position;
   brake means associated with said drive wheels for effecting simultaneous braking thereof, said brake means including a manually operated brake control linkage operatively associated therewith;
   an override link interconnecting said brake control linkage and said pump speed control means, said override link having a second lost motion connection with said pump speed control means so disposed that upon said brake control linkage being in a normal unbraked position, said second lost motion connection permits said pump speed control means to operate unhindered throughout its entire range of positions in response to operator movement of said speed control lever and upon said brake control linkage being actuated to brake said drive wheels with said speed control lever fixed in a forward position, said pump speed control means is returned to its neutral position overcoming said first spring-biased lost motion connection.

2. The invention in accordance with claim 1 and said speed control lever having a reverse position and said means for fixing the position of said speed control lever being inoperative in said reverse position.

* * * * *